Jan. 4, 1927.  
J. F. O'CONNOR  
1,612,876  
FRICTION SHOCK ABSORBING MECHANISM  
Filed Dec. 14, 1922   2 Sheets-Sheet 2
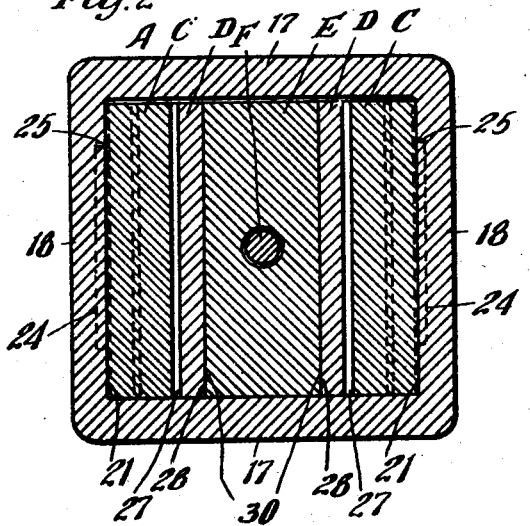
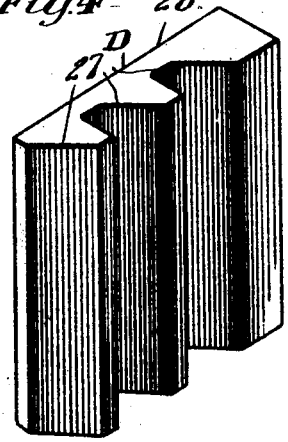
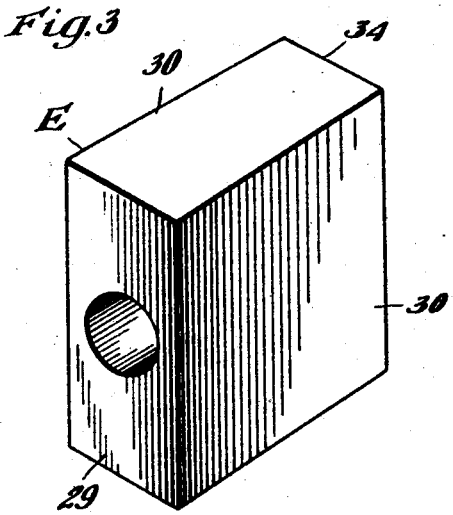
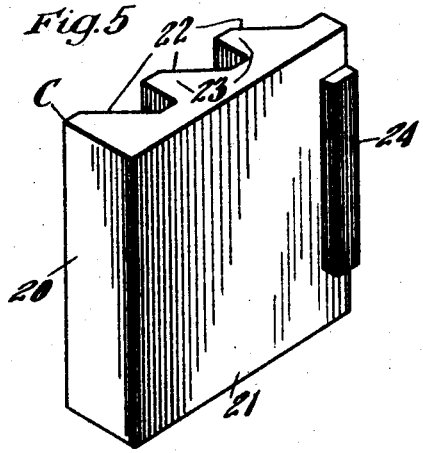
Witnesses  
Wm. Geiger
Inventor  
John F. O'Connor  
By Geo. I. Haight  
his Atty.

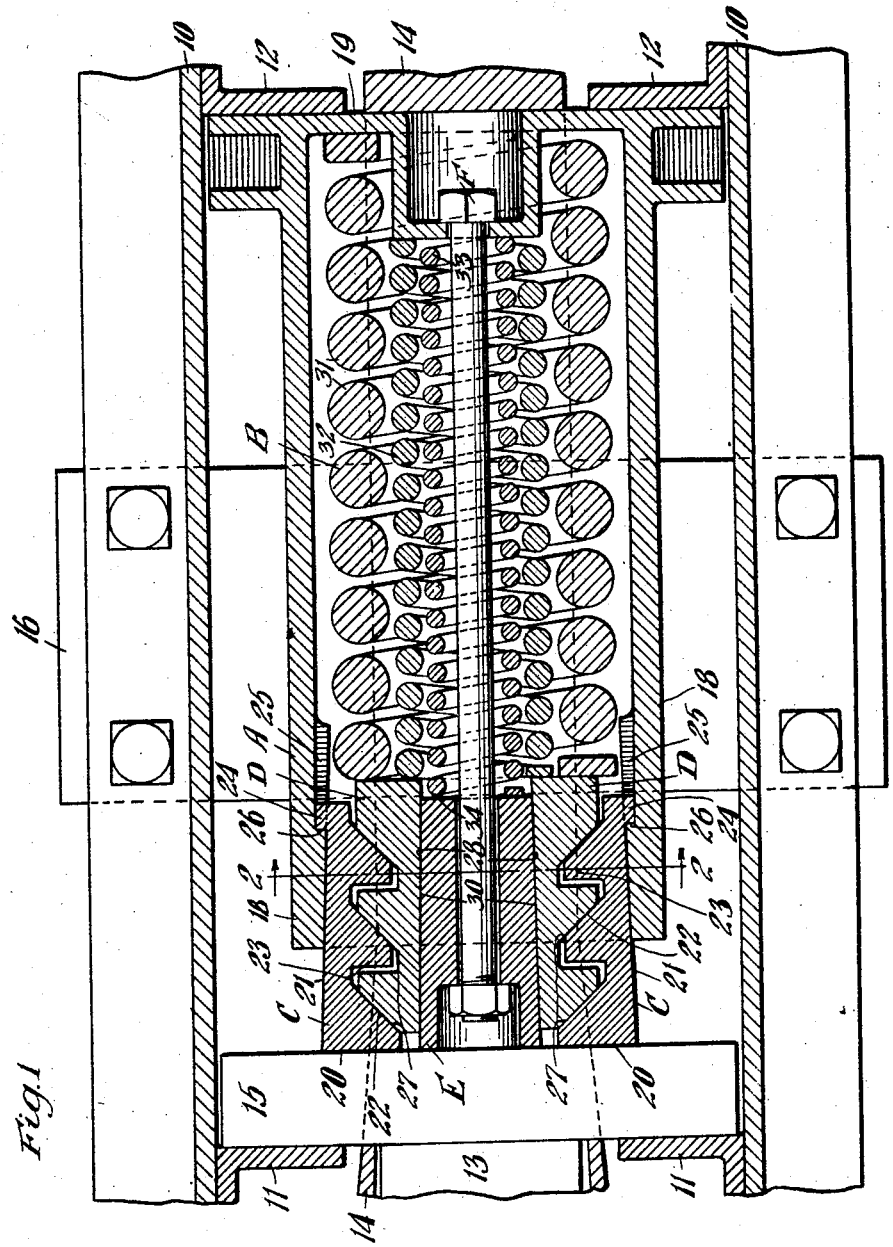

Patented Jan. 4, 1927.

1,612,876

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 14, 1922. Serial No. 606,924.

This invention relates to improvements in friction shock absorbing mechanisms.

An object of the invention is to provide a friction shock absorbing mechanism especially adapted for railway draft riggings wherein high capacity is obtained by means of a simple and economical arrangement of friction-creating elements.

In the drawings forming a part of this specification, Figure 1 is a horizontal longitudinal sectional view of a portion of a railway draft rigging showing my improvements in connection therewith. Figure 2 is a vertical transverse sectional view of the shock absorbing mechanism proper corresponding to the line 2—2 of Figure 1. And Figures 3, 4 and 5 are detail perspectives of the central friction block, a wedge member and a friction shoe respectively, employed with my arrangement.

In said drawings, 10—10 denote channel draft sills of a car underframe to the inner faces of which are secured front stop lugs 11 and rear stop lugs 12. A portion of a drawbar is indicated at 13, the same being operatively associated with the shock absorbing mechanism proper by a hooded cast yoke 14 within which is disposed the shock absorbing mechanism and a front follower 15. The parts are supported in operative position by a detachable saddle plate 16.

The improved shock absorbing mechanism proper, as shown, comprises, broadly, a combined friction shell and spring cage casting A; a three-coil spring resistance designated generally by the reference character B; a pair of friction shoes C—C; a pair of wedge gripping elements D—D; a central block E; and a retainer bolt F.

The casting A, as shown, is of rectangular cross section having top and bottom walls 17—17, side walls 18—18 and an integral rear wall 19. The latter is laterally extended and suitably reinforced to adapt it to function as the rear follower of the mechanism.

The two friction shoes C are of like construction, each being provided at its front end with a transverse bearing face 20 engageable with the follower 15, an outer longitudinally extending flat friction surface 21, and three wedge faces 22—22, longitudinally separated and inclined forwardly of the shell toward the axis thereof. Two transverse shoulders 23—23 are formed inwardly of the two outer wedge faces 22. Each shoe C is also provided, on its outer side, with a laterally extended lug 24 at its inner end which slides within a correspondingly shaped groove 25 on the inner side of the side wall of the shell, the latter having stop shoulders 26 at the forward ends of said grooves to thereby limit the outward movement of the shoes with respect to the shell.

The two wedge gripping elements D are of like construction, each being provided with three wedge faces 27—27 separated longitudinally and adapted to cooperate with corresponding wedge faces 22 of the respective shoes C. Each element D is further provided, on its inner side, with a longitudinally extending flat surface 28.

The central block E is in the form of a relatively heavy casting substantially solid, except for the openings therein to accommodate the retainer bolt. Said block, at its forward end, has a transverse face 29 which normally engages the follower 15, as shown in Figure 1. Said block E is further provided with two opposed longitudinally extending flat surfaces 30—30 which engage with the surfaces 28 of the elements D. As will be apparent from an inspection of Figure 1, the inner end of the block E is normally disposed forwardly of the inner ends of the elements D.

The spring resistance B, as heretofore described, consists of three coils, comprising an outer heavy coil 31, an intermediate coil 32, and a central coil 33. The two coils 31 and 32 bear at their front ends upon the inner ends of the wedge elements D and at their rear ends, said coils bear upon portions of the casting A. The central coil 33 bears at its inner end upon a portion of the casting A and at its forward end upon the inner end 34 of the block E.

The retainer bolt F is anchored at its inner end within a hollow boss formed integral with the casting A and at its forward end is anchored within a suitable recess provided in the block E.

As clearly shown in Figure 1, the shell friction surfaces on the inner faces of the side walls 18 and the cooperating surfaces 21 of the shoes C, are converged slightly inwardly of the shell. The same is also true of the sets of cooperating faces 28 and 30 on the wedge elements D and block E, respectively. In actual practice, the taper or degree of convergence of the surfaces 28 and 30 will be made slightly less than the taper of the shell friction surfaces and those of the shoes C.

The operation of the mechanism, assuming a compression stroke under buff, is as follows. At the initiation of the compression stroke, the shoes C and block E will be engaged by the follower 15 and forced to travel longitudinally in unison therewith. As the shoes C travel down the inclined shell friction surfaces, they will be compelled to move laterally toward each other, thereby setting up a differential action on the wedge elements D. The latter, gripping the block E between them, will then act substantially as a solid unit, said unit advancing longitudinally at a slightly faster rate than the shoes C and thereby drawing the block E away from the follower 15. This action is of course yieldingly resisted by all three coils of the spring resistance B. The differential action above described is accommodated by leaving sufficient clearance between the opposed shoulders of the shoes C and elements D, as shown in Figure 1. Upon discontinuance of the compressing force, the center coil 32 acts directly upon the block E to impel the latter outwardly with respect to the wedge elements D, this action being facilitated by the cooperating tapered surfaces. Furthermore, the shoes C, with the wedge unit therebetween, will be projected outwardly under the influence of the two coils 31 and 32, this action being facilitated by the relatively blunt angles of the cooperating wedge faces and the outward flare of the friction shell surfaces. The outward movement of the parts is limited by the cooperating shoulders of the shoes and shell and also, with respect to the block E, by the retainer bolt F. Wear on the parts is automatically compensated for by the gradual outward creeping of the wedge elements D between the shoes and the block E.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior opposed friction surfaces; of a spring resistance; opposed friction shoes cooperable with the shell and adapted to receive directly the actuating force, said shoes, on their inner faces, having wedge sections; a wedge element cooperable with each shoe; and a centrally disposed member interposed between said wedge elements, said member and elements having engaging faces extending lengthwise of the shell.

2. In a friction shock absorbing mechanism, the combination with a friction shell having interior opposed friction surfaces; of a spring resistance; opposed friction shoes cooperable with the shell and adapted to receive directly the actuating force, said shoes, on their inner faces, having wedge sections; a wedge element cooperable with each shoe; and a centrally disposed member interposed between said wedge elements, said member and elements having engaging faces extending lengthwise of the shell, the outer end of said member being normally flush with the outer ends of the friction shoes.

3. In a friction shock absorbing mechanism, the combination with a friction shell having interior opposed friction surfaces; of a spring resistance; opposed friction shoes cooperable with the shell and adapted to receive directly the actuating force, said shoes, on their inner faces, having wedge sections; a wedge element cooperable with each shoe; a centrally disposed member interposed between said wedge elements, said member and elements having engaging faces extending lengthwise of the shell; means limiting the outward movement of the shoes with respect to the shell; and separate means limiting the outward movement of said member with respect to the shell.

4. In a friction shock absorbing mechanism, the combination with a friction shell having interior opposed friction surfaces converged inwardly of the shell; pressure-transmitting friction shoes cooperable with the shell and having wedge faces on their inner sides; wedge elements cooperable with the shoes; a member interposed between said wedge elements, said member and elements having engaging faces converged slightly inwardly of the shell; and a spring resistance interposed between said wedge elements and the shell.

5. In a friction shock absorbing mechanism, the combination with a friction shell having interior opposed friction surfaces converged inwardly of the shell; pressure-transmitting friction shoes cooperable with the shell and having wedge faces on their inner sides; wedge elements cooperable with the shoes and adapted for gradual movement outwardly of the shell with respect to the shoes to compensate for wear; a member interposed between said wedge elements, said member and elements having engaging faces extending lengthwise of the shell; a spring resistance interposed between said wedge elements and the shell; and means limiting the outward movement of said shoes with respect to the shell.

In witness that I claim the foregoing I have hereunto subscribed my name this 27 day of Oct. 1922.

JOHN F. O'CONNOR.